United States Patent [19]

Conway et al.

[11] 3,768,645
[45] Oct. 30, 1973

[54] METHOD AND MEANS FOR AUTOMATICALLY DETECTING AND SORTING PRODUCE ACCORDING TO INTERNAL DAMAGE

[75] Inventors: Tim D. Conway, Upland; Paul F. Paddock, Riverside, both of Calif.

[73] Assignee: Sunkist Growers Inc., Sherman Oaks, Calif.

[22] Filed: Feb. 22, 1971

[21] Appl. No.: 117,565

[52] U.S. Cl. .......................... 209/111.5, 250/83.3 D
[51] Int. Cl. .............................................. B07c 5/34
[58] Field of Search ................. 209/111.5; 250/223, 250/93, 83.3 R, 52, 53, 83.3 D; 198/38

[56] References Cited
UNITED STATES PATENTS

| 3,594,579 | 7/1971 | Garrett | 209/111.5 |
| 2,532,644 | 12/1950 | Robinson | 209/71 |
| 3,366,236 | 1/1968 | Breazeale | 209/111.5 |
| 3,286,811 | 11/1966 | McWilliams | 198/38 |
| 3,662,170 | 5/1972 | Keyes | 250/83.3 D |
| 3,614,432 | 10/1971 | Green | 250/83.3 D |
| 3,655,964 | 4/1972 | Slight | 209/111.5 |
| 3,372,276 | 3/1968 | Reynolds et al. | 250/83.3 D |

Primary Examiner—Allen N. Knowles
Attorney—Paul A. Weilein

[57] ABSTRACT

Apparatus and method for automatically evaluating articles, particularly citrus fruits, on the basis of the uniformity and non-uniformity of their transparency to X-rays and selectively separating them into different grades according to such evaluations, the fruit being oriented and carried by a conveyor in a path between an X-ray source and X-ray detectors positioned to straddle the fruit core portion, the signals from the detectors being carried in an internal quality computer controlled by timing sensors responsive to fruit movement through the X-rays, wherein the percentage of internal damage is computed for each fruit, after which the fruits are successively separated into different predetermined grades according to their respective damage evaluations.

24 Claims, 8 Drawing Figures

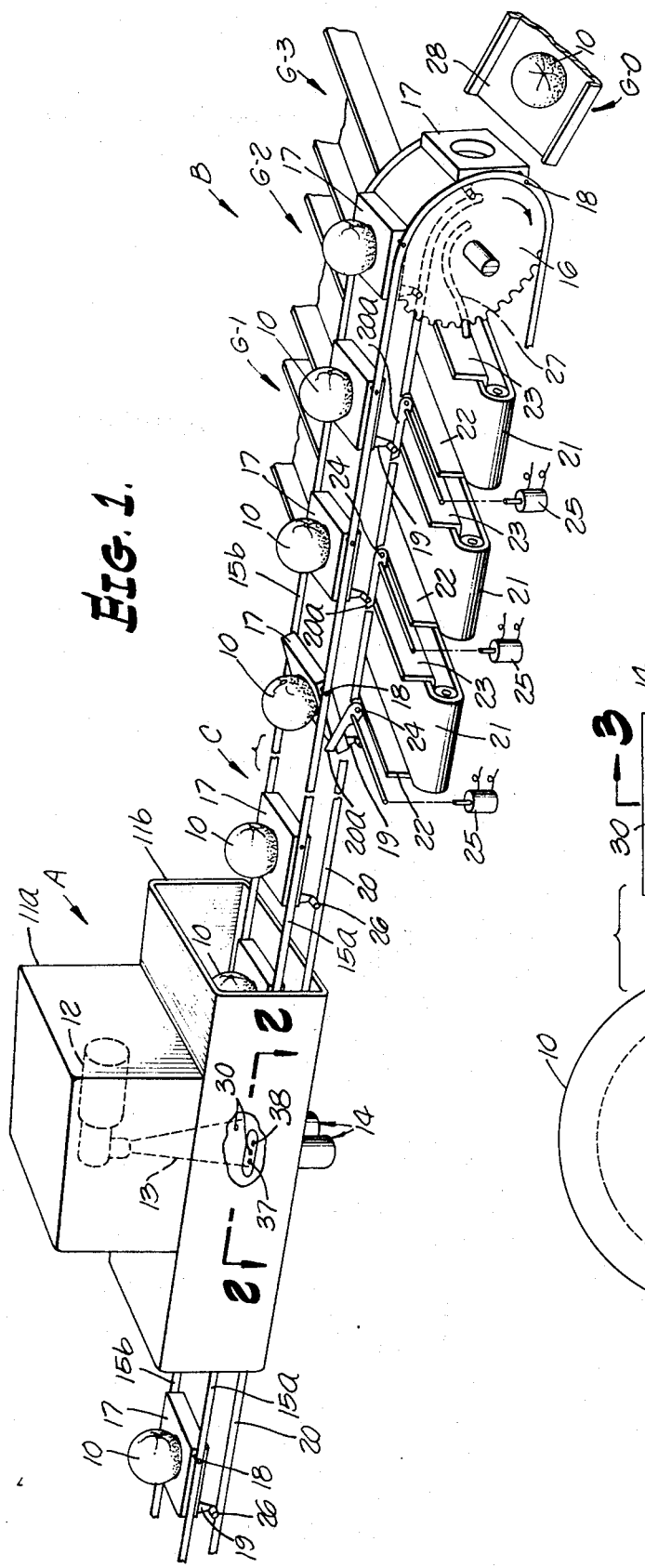

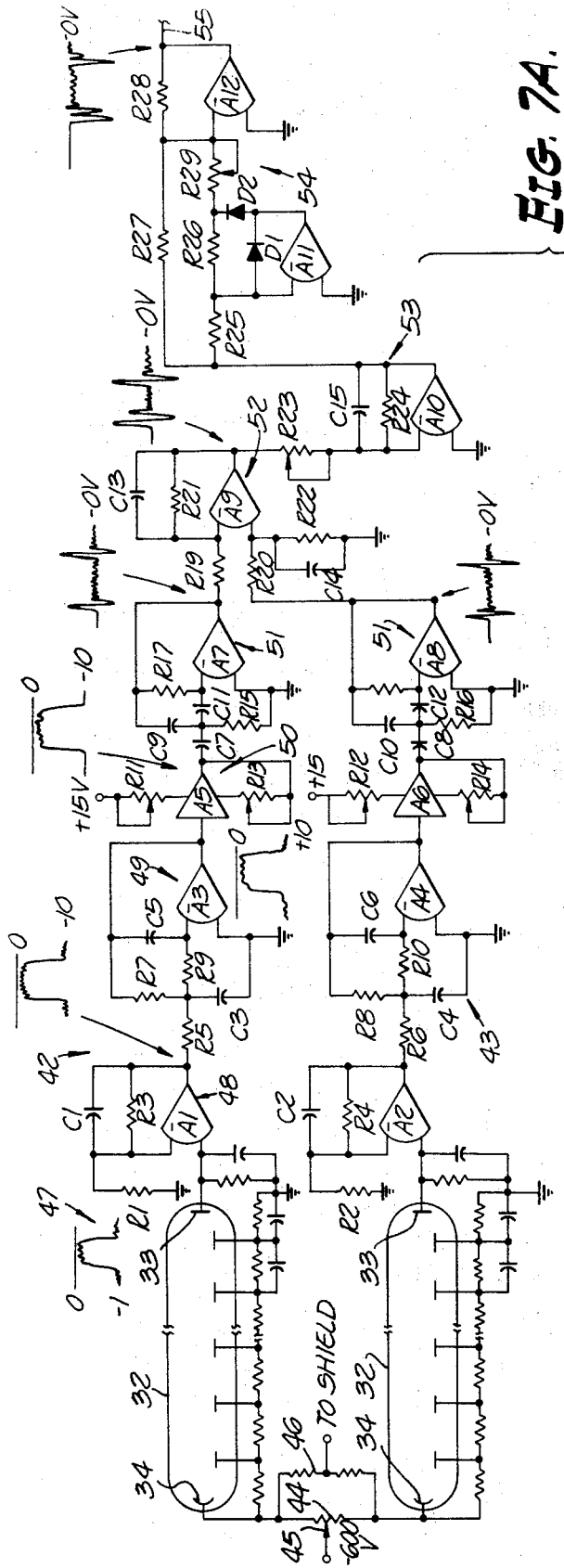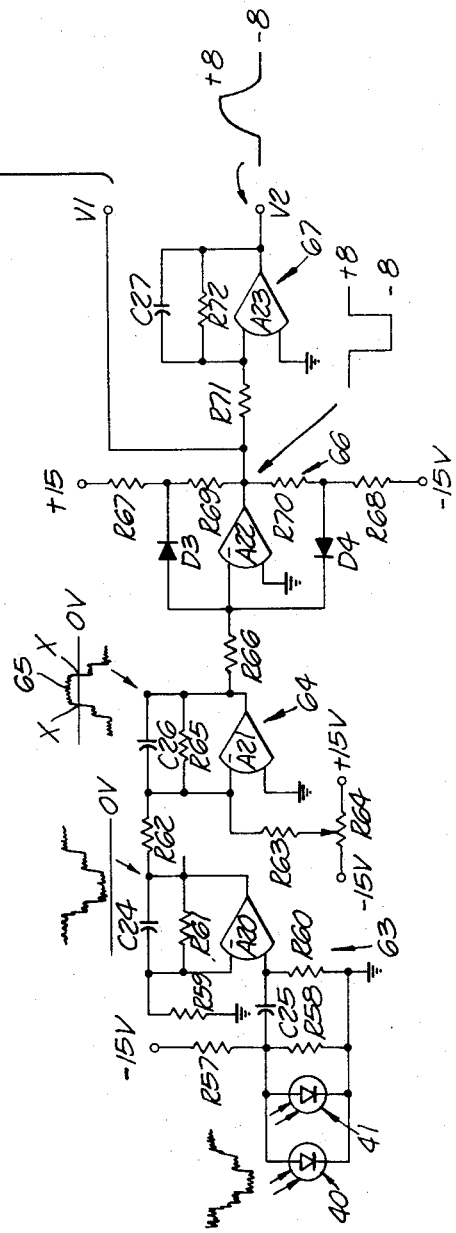
FIG. 7A.

METHOD AND MEANS FOR AUTOMATICALLY DETECTING AND SORTING PRODUCE ACCORDING TO INTERNAL DAMAGE

BACKGROUND OF THE INVENTION

The present invention relates to the field of testing and evaluation of objects according to variations in their internal characteristics.

Heretofore, it had been generally known to utilize X-rays in industry and other fields for the inspection and evaluation of objects for internal flaws and damage of a character which were not usually externally visible.

It then became evident that X-rays provided a very useful and effective tool which could be used for the examination and evaluation of citrus fruits for damage to the internal tissue of the fruit from exposure to freezing temperatures, as well as tissue deterioration in the form of so-called granulation. Thus, it became a commonly known practice to utilize X-rays for grading oranges by procedures in which the final determination was dependent upon the visual observations of a human operator, and which were subject to the usually present possibilities of human error. Researchers therefore directed their energies towards the development of apparatus which would work automatically, and would not be dependent upon the mental processes of an operator. One such approach was that disclosed in the Robinson U.S. Pat. No. 2,532,644, issued Dec. 5, 1950. Briefly, this patent discloses the concept of automatically selecting as between damaged and undamaged fruit by means of an arrangement in which the fruit is successively passed between an X-ray source and a fluorescent screen in a manner to scan the fruit so as to determine the X-ray transparency from part to part, and then utilize means for translating changes in transparency as between these parts for selecting between the damaged and undamaged fruit at a rejection station where the good fruit and bad fruit are separated.

Although the arrangement of this patent was an improvement over the previously known devices and solved the problem of operator error, the arrangement of the patent had certain operating limitations which did not lend themselves to situations where more accurate determinations of damage were desirable, or where the fruit was to be separated into several different grades rather than merely the simple separation of good fruit from bad fruit.

In the known prior art, as exemplified by the Roop U.S. Pat. No. 2,679,317, apparatus has been shown which is designed to utilize X-ray for inspecting and grading the fruit according to its juice content, the graded fruits being transported to a sorting station where they are separated into the respective grades. The separation of each fruit is accomplished by a catapult which is controlled in accordance with an inspection record carried along with the fruit on the conveyor, this inspection record being of such character and involving means which will operate at the sorting station to activate the proper catapult at the right time to place the particular fruit in its proper receptacle. The disclosed apparatus of this patent has the disadvantage in that the accuracy of the juice content determination may be affected by variations in the size of the fruit. To overcome this objection, the patentees suggest that the fruit be pre-sized prior to inspection.

In the present invention, it is proposed to overcome the undesirable operating drawbacks of the prior art apparatus and methods by providing a greatly simplified mechanical embodiment, and by the utilization of a unique internal quality electronic computer which provides a very high degree of flexibility and more accurate determination of the fruit damage.

SUMMARY OF THE INVENTION

The present invention relates generally to apparatus and method for automatically inspecting objects and evaluating them according to an internal characteristic, and then separating the objects into groups according to the evaluated characteristic.

It is one object of the herein disclosed invention to provide improved inspection and sorting apparatus for citrus fruit, which embodies greater flexibility of operation than the heretofore known apparatus, and which is so designed that a high degree of accuracy will be obtained in the evaluation of a variety of internal damage characteristics, such as may result from frost, granulation, sunburn, blossom end decline, and other causes.

A further object is to provide improved and unique X-ray inspection means and method for evaluating the internal damage of fruit, in which the fruit is substantially similarly oriented prior to inspection, so as to produce a more accurate evaluation of the fruit damage.

A further object concerns the provision of unique inspection apparatus for fruit, wherein the fruit is scanned by X-rays on opposite sides of its core structure to produce electric signals which are determinative of internal meat tissue damage, and wherein the signals are introduced into an electric computer circuit which translates the signals into a percentage valuation of the fruit damage.

A further object is to provide apparatus of the herein described type in which X-ray fruit scanning signals are conducted to a computer circuit in which the signals are integrated and compensated for fruit size so as to produce a percentage indication of the internal damage of the fruit meat tissue.

Another object of the invention concerns the provision of apparatus in which X-ray damage sensors are operatively controlled by photoresponsive timing sensors so as to evaluate internal damage of the meat tissue of the fruit and eliminate errors due to skin portions of the fruit.

Still another object is to provide unique electronic computer means in connection with X-ray fruit inspection and separating apparatus, for integrating and evaluating the output signals of fruit damage sensors and classifying these evaluations into groups according to the percentage of damage to the meat tissue portions of the fruit, and upon movement of the fruit to a sorting station to automatically separate the fruit into the respective classified groups.

It is also a further object to provide improved apparatus for automatically inspecting and sorting a fruit, such as citrus fruit, wherein the fruits will be successively carried on a continuously moving conveyor past X-ray sensors at an inspection station en route to a sorting station, the sensors having their outputs connected with electrical means for evaluating the internal damage of each fruit in relation to damage classification groups, and wherein the group evaluation accorded to each fruit is stored in memory means until the fruit reaches a conveyor position at the sorting station to permit its discharge into the proper group corresponding to its predetermined group evaluation.

Further objects and advantages of the invention will be brought out in the following part of the specification, wherein detailed description is for the purpose of fully disclosing one embodiment of the invention without placing limitations thereon.

BRIEF DESCRIPTION OF THE DRAWINGS

Referring to the accompanying drawings, which are for illustrative purposes only:

FIG. 1 is a perspective view diagrammatically illustrating apparatus embodying the basic principles of the invention;

FIG. 2 is a view diagrammatically illustrating the positioning of the damage sensors and timing sensors in relation to the entering fruit at the inspection station as viewed in the direction of line 2—2 of FIG. 1;

FIG. 3 is an enlarged fragmentary section taken substantially on line 3—3 of FIG. 2, and diagrammatically illustrates an end section of a photomultiplier tube with a connected crystal scintillator as utilized in the damage sensor;

FIGS. 7A and 7B are more detailed wiring diagram views of the circuitry shown in FIG. 6.

DESCRIPTION OF THE DISCLOSED EMBODIMENT

Figure 4:
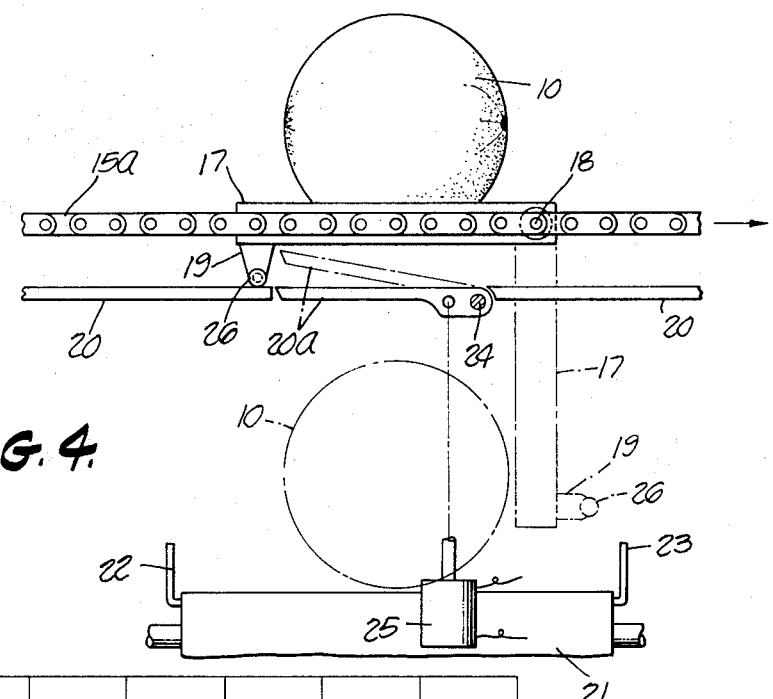
FIG. 4 is an enlarged fragmentary side elevational view diagrammatically illustrating mechanism for the discharge of fruit from the conveyor at a grade separation position at the sorting station.

Referring more specifically to the drawings, for illustrative purposes, the present invention is shown as being embodied in apparatus as generally shown in FIG. 1 as comprising an inspection or detecting station A and a sorting or grading station B, which are in physically spaced apart locations, but are interconnected by means of a suitable conveyor C by means of which individual fruits 10 may be continuously and successively moved through the inspection station and thence to the sorting station where they are discharged into various grades depending upon the evaluated characteristics at the inspection station.

It will be appreciated that the apparatus may vary as to configuration and as to details of the parts thereof without departing from the basic concepts as disclosed herein. The inspection or detecting station A in general comprises a housing in which an upper compartment 11a houses an X-ray generator 12 arranged to project a beam 13 of X-rays into a lower tunnel-like housing compartment 11b through which the fruit is conducted by the conveyor in a path which will intercept the X-ray beam and associated internal characteristic sensors as generally indicated at 14.

Basically, the conveyor may comprise an embodiment which is illustrated as incorporating laterally spaced chains or linkages 15a and 15b that are trained over suitable driving wheel means 16 and idler means (not shown) at the opposite end of the conveyor to separate the conveyor into upper and lower runs, the upper run passing through the housing compartment 11b. Each fruit 10 is preoriented prior to its reaching the inspection station, and is carried by a conveyor platform 17 which is swingably pivoted as by a pivotal support 18 at its leading end to the associated linkages 15a and 15b of the conveyor. The platform is normally held in a horizontal fruit transporting position against swinging movement about its pivotal support by means of a depending bracket 19 at the trailing end of the platform, which is adapted to normally ride upon an underlying rail member 20.

After passage of the fruit through the inspection or detecting station A, where it is evaluated with respect to its internal damage and classified as to its grade by means of an internal quality computer as will hereinafter be described in detail, the fruit is then carried to the sorting or grading station B where it will be automatically deposited at the proper grade separation position in the movement of the conveyor.

As diagrammatically illustrated in FIG. 1, the sorting or grading station B is arranged to provide for separation of the fruit into four grades, namely designated as G-3, G-2, G-1, and G-O, which are of progressively decreasing damage, the grade G-O being nondamaged fruit. At each grade position, means are provided for separately receiving from the conveyor C the respective fruits according to the grades as evaluated by the internal quality computer. Thus, at each grade position there is provided a chute or other conventional means for carrying the fruit away from the conveyor C. Preferably, such means comprises a movable conveyor belt, as indicated by the numeral 21, and which may be flanked by side walls 22 and 23 for guidingly retaining the fruit on the conveyor.

Provision is also made at each grade position for tilting the platform 17 so as to cause the displacement of the fruit thereon. One arrangement which may be utilized for this purpose is diagrammatically illustrated in FIG. 4 wherein there is provided at each grade position a pivoted rail section 20a, this section being swingably supported at its right end on a pivot 24. Normally, the rail section 20a is longitudinally aligned with the main rail portions 20, but may be swung in a clockwise direction to a raised position of its free end as shown in phantom lines upon energization of a connected actuating solenoid 25. In the raised position the rail section 20a functions as a camming member in the path of travel of a laterally projecting roller 26 carried by the depending bracket 19. The platform 17 is thus swingably deflected in a counterclockwise direction about its pivot 18 so as to discharge the fruit onto the associated conveyor 21. When the downwardly hanging platform reaches the end of the conveyor C, the roller 26 will engage a position restoring camming rail 27 (FIG. 1) which will cause the platform to assume a normal position during the lower run of the conveyor. The energization of the correct actuating solenoid 25 for depositing the fruit at its proper grade position is determined by the quality computer which will hereinafter be explained in detail. The nondamaged fruit of grade G-O will be carried to the conveyor end where it will be discharged onto a receiving chute 28 or other appropriate means such as a conveyor belt for guiding or transporting the fruit to a collection point.

As shown in FIG. 2, the sensors 14—14 are positioned below a lead collimating plate 29 which is provided with spaced apart openings 30—30 that are positioned above the respective sensors so as to provide for the entrance of an X-ray beam along each side of the fruit core portion 31 as the fruit is carried along a path of movement by the conveyor C.

As shown in FIG. 3, the collimating plate causes an X-ray beam 13a to enter the sensor 14 positioned therebelow, each of the sensors comprising a photomultiplier tube 32 having an anode 33 and a cathode 34 (FIG. 7A) which forms a photosensitive surface positioned to receive incident light scintillations which are generated in an associated crystal 35 of sodium-iodide or other material which will scintillate in response to bombardment by X-rays. As shown, the crystal is secured to the end of the photomultiplier tube 32 by means of a retaining cap 36 or other suitable means.

Figure 5:
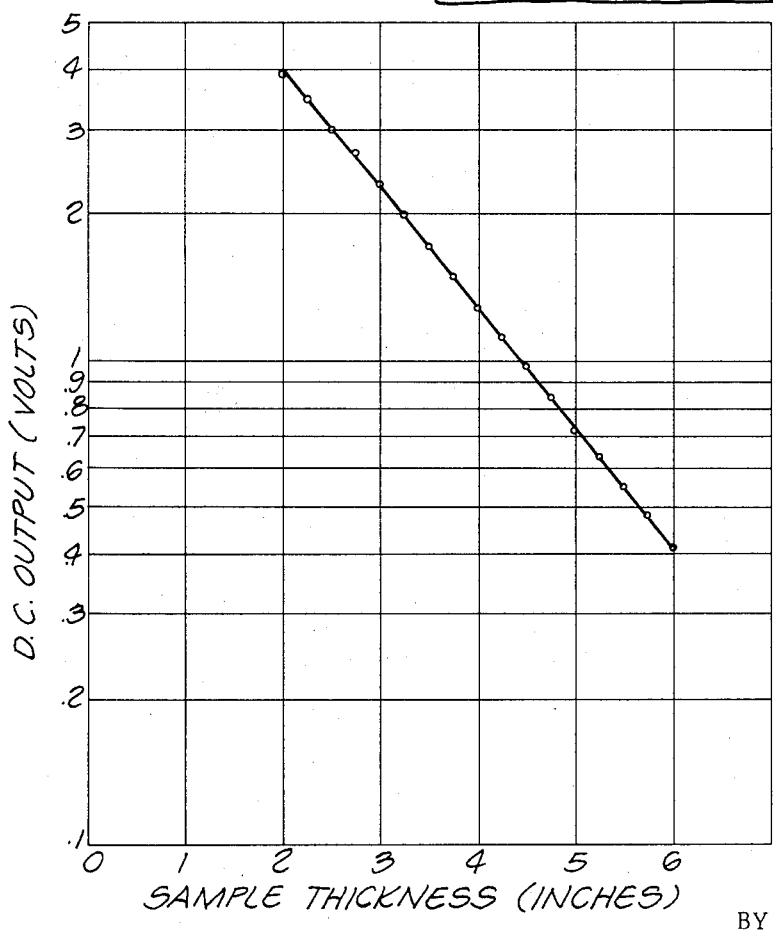
FIG. 5 is a graph showing the relationship between the output voltage of the photomultiplier tube of a damage sensor, and changes in fruit thickness or diameter.

The operation of photomultiplier tubes is well known in the electronic field. Briefly, the cathode electron current is amplified and utilized to produce a photomultiplier output voltage which is characteristic of the fruit X-ray absorption. The logarithmic relationship between the photomultiplier output voltage and fruit thickness is shown in FIG. 5. For proper operation, the anode current is set at 10 microamperes in the open X-ray beam by varying the high voltage bias on the photomultiplier tube.

Since the skin portion of the fruit has a different density than the meat portion, it will be appreciated that in many cases a large output voltage signal will be supplied by the photomultiplier tube as the damage sensors pass from the skin portion of the fruit to the meat portion thereof. It is, of course, desirable to eliminate the error caused by such a signal, and begin the damage evaluation period after the damage sensor has left the skin portion and entered the meat portion of the fruit, and end the evaluation period before the sensor again enters the skin portion as the fruit progresses past the X-rays.

Elimination of such errors is accomplished by using two timing sensors 37 and 38 which are positioned as shown in FIG. 2 so that one will be ahead of the damage sensors and the other will follow the sensors in the path of movement of the fruit. The timing sensors are supported for adjustable movements in the plate 29 as by means of manually operable screws 39—39 which provide for independent adjusting movements of each timing sensor. The timing sensors are utilized in connection with a timing circuit, which will be discussed later in detail, to obtain timing signals for coordinating certain operating phases of the internal quality computer. Briefly, the timing sensors comprise a pair of silicon photodiodes 40 and 41 (FIG. 7A). These diodes are connected in parallel and arranged in a circuit to provide a voltage output signal such that when the skin portion at the leading end of the fruit covers one sensor, the output voltage will be cut substantially in half, and when both sensors are covered, the output voltage will be substantially zero. The spacing between the diodes, as indicated at $a$, will be substantially equal to the fruit skin portion average thickness at its leading end and trailing end, respectively, as indicated at $b$.

Figure 6:
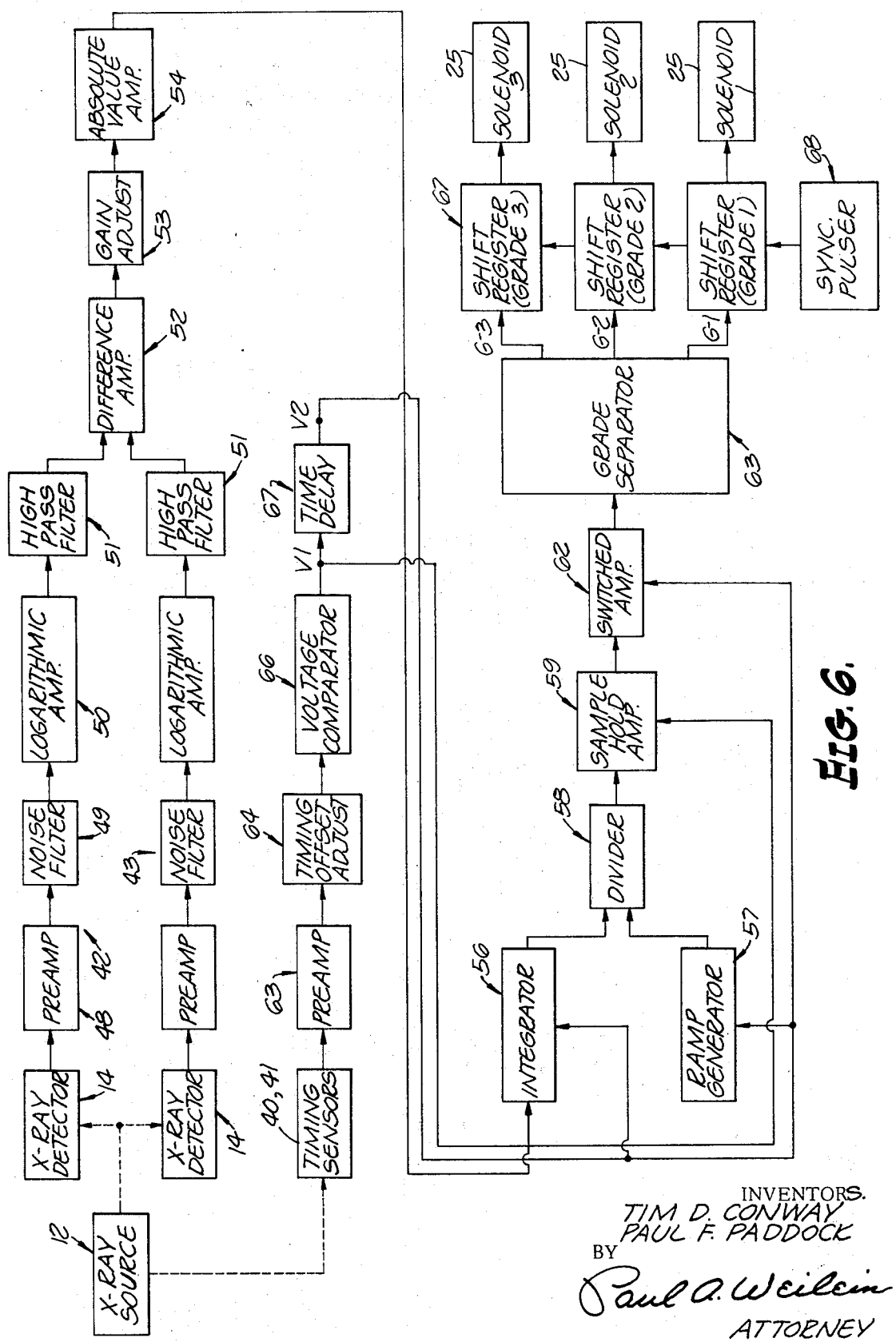
FIG. 6 is a schematic block diagram of the circuitry for the components at the inspection station, the damage evaluating computer control, and the grade separating means at the sorting station.
Figure 7B:
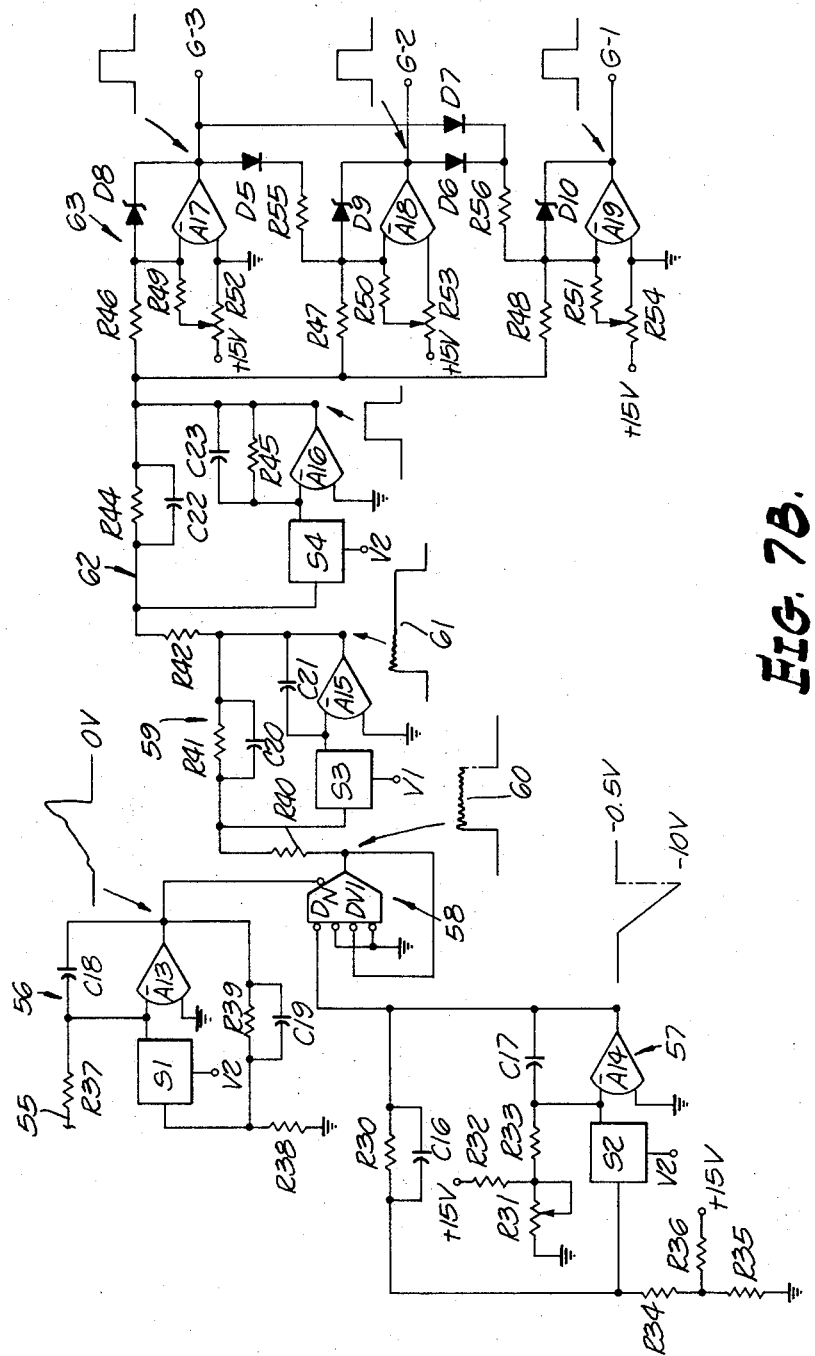

Referring more specifically to the schematic block diagram of FIG. 6 and the detailed circuitry as shown in FIGS. 7A and 7B, the details of the internal quality computer and associated timing means, for evaluating the fruit damage and separating it into predetermined grades according to such damage, now will be described more fully. As will be observed, the two photomultiplier tubes 32—32 of the respective internal characteristic sensors are connected to provide inputs to similar damage evaluating circuits 42 and 43 which are connected to the anodes 33—33 respectively of the photomultiplier tubes 32—32. These tubes have their cathodes 34—34 connected with the ends of a suitable control potentiometer 44 having a movable contact 45 connected with an appropriate high voltage source shown as comprising —600 volts which provides for an appropriate bias adjustment for obtaining the desired anode current setting. The ends of the potentiometer are connected across a resistor 46 having its midpoint connected to an electrostatic shield according to general practice. The output voltage, as indicated at 47, is in each case fed to an input or preamplifier 48. Since the two previously mentioned evaluating circuits 42 and 43 contain similarly connected components, it is believed that the detailed description of only one of these circuits will be necessary for a proper understanding of this portion of the computer.

Thus, in the evaluating circuit 42, the preamplifier 48 is provided to isolate the output of the internal characteristic sensors and amplify the output voltage of the connected photomultiplier. This preamplifier includes a conventional basic amplifier component A1, with the resistors R1 and R3 forming a feedback path that sets the stage gain to approximately 10, and the capacitor C1 reducing the stage gain to unity at high frequencies.

The output from the preamplifier 48 is connected through a resistor R5 with the input to a noise filter circuit 49 which will eliminate high frequency noise signals that do not relate to fruit damage. This low pass filter circuit utilizes a conventional basic amplifier component A3. A capacitor C5 and resistor R7 are connected in parallel to form a feedback path which operates in conjunction with the resistor R5. A resistor R9 and capacitor C3 operate to make the amplifier gain decrease 12 db/octave above 250 Hz.

The output of the noise filter 49 feeds a logarithmic amplifier circuit 50 which is utilized to compensate for the logarithmic absorption characteristic of the fruit, as shown in FIG. 5, in such a manner that a change due to damage will cause the same output for a small fruit as for a large fruit, and wherein the output voltage increases upwardly towards +10 volts. This circuit utilizes a conventional basic amplifier component A5 having a balance control resistor R11 which is adjustable for eliminating the amplifier offset output voltage. A resistor R13 is connected in a gain control circuit which is adjustable for the exact logarithmic transfer characteristic.

The output of the logarithmic amplifier circuit 50 connects with a high pass filter circuit 51 which is utilized to eliminate low frequency signals caused by drift errors, fruit shape irregularities longer than 0.2 inches, and differences in thickness from one side of the fruit to the other. This circuit utilizes a conventional basic amplifier component A7, and a capacitor C9 and resistor R17 provide a feedback path which operates in conjunction with a capacitor C7, capacitor C11 and resistor R15 so as to make the amplifier gain decrease on the order of 12 db/octave below 75 Hz.

The outputs from the two high pass filter circuits 51—51 of the evaluation circuits 42 and 43 are fed into a common difference amplifier circuit 52 which subtracts the two filtered and compensated output signals from the evaluation circuits 42 and 43. This output corresponds to the difference between the evaluation on one side of the fruit core and the evaluation on the other side for small anomalies. A good fruit will have few anomalies and the output will be relatively small. A bad fruit will have an output consisting of many large pulses. The difference amplifier circuit 52 utilizes a basic amplifier component A9 which receives the separate input signals through resistors R19 and R20 respectively. Resistors R21 and R22 are utilized to set the difference gain to approximately 7. The capacitors C13 and C14 provide an AC feedback to decrease gain at frequencies above 500 Hz.

The difference amplifier circuit 52 feeds into a gain adjustment amplifier circuit 53 which is utilized to adjust and vary the gain for different types of internal damage from a control center. For example, investigation and tests indicate that fruit granulation will require a higher gain setting than frost damage. The gain or damage sensitivity amplifier circuit 53 utilizes a basic amplifier component A10. A DC feedback having a resistor R24 therein sets a constant amount of feedback. A variable input resistor R23 provides an adjustment which allows the stage gain to be varied substantially from 1 to 10. A capacitor C15 paralleling the resistor R24 provides an AC feedback which operates to reduce noise at high frequencies.

Output from the gain adjustment amplifier circuit 53 is fed to an absolute value amplifier circuit 54 which utilizes interconnected basic amplifier components A11 and A12. The amplifier A11 operates as a unity gain inverter for positive signals only. A diode D1 makes the gain substantially zero for negative input signals. The amplifier A12 is utilized as a summing amplifier with respect to which a resistor R28 sets a constant DC feedback. A resistor R27, which is connected in series with resistor R28, makes the gain of amplifier A12 equal to 1 for input signals received from the gain adjustment amplifying circuit, while a resistor R29 makes the gain of the amplifier A12 equal to 2 for signals received from the amplifier A11. The output of the absolute value circuit 54 is the absolute value of its received input and comprises the instantaneous magnitude of the difference in thickness of the two halves of the fruit lying on opposite sides of the fruit core.

The absolute value circuit 54 (FIG. 7A) is shown as being connected through a conductor 55 to an input resistor R37 (FIG. 7B) of an integrator circuit 56. This circuit integrates the received absolute value signal over the period when the fruit is being moved by the conveyor over the sensors 14. The final value of the integration is the area under all of the absolute value output pulses. This value will be much larger for a bad fruit for the reason that there will be more pulses and these pulses will be larger than for a good fruit. The integrator circuit 56 includes a basic amplifier component A13 which is controlled by means of an electronic switch S1 connected to receive a control voltage signal from the voltage output terminal V2 of the timing circuit (FIG. 7A) in such a manner that the integrated output will be for the time that the sensors are evaluating the meat portion of the fruit. When the electronic switch S1 is open, a capacitor C18 will be charged at a linear rate determined by the output of the amplifier component A12 and resistor R37. When the switch S1 is closed, resistors R38 and R39 function to maintain the output of the amplifier component A13 at 0 volts. A capacitor C19 prevents overshoot in the output of the amplifier component A13 as the switch changes from open to closed position.

A ramp generator circuit 57 is provided to produce a ramp wave form which may be varied to provide for fruit size compensation in order to obtain maximum system accuracy for any given lot of fruit. Although the system is designed to grade fruit from 2 inches in diameter to 6 inches in diameter, small fruit can be graded more accurately if the size compensation is adjusted to allow for the maximum size to be run. Specifically, the ramp generator utilizes a basic amplifier component A14 which is controlled by an electronic switch S2 in an integrator circuit similar to the integrator circuit 56. A resistor R31 provides for central control adjustment and with a resistor R32 forms a voltage divider which sets the input to a constant DC level. When this input is integrated, it becomes a ramp wave form as a capacitor C17 is linearly charged. Resistors R35 and R36 constitute a voltage divider which establishes the output of the amplifier component A14 at substantially −0.5 volts when the switch S2 is closed.

The outputs of the integrator circuit 56 and the ramp generator circuit 57 are fed into a divider circuit 58 comprising a basic divider component DV1 which functions in a well known manner to divide the output of the integrator circuit 56 by the output of the ramp generator circuit 57. Since the integrator output is proportional to the total amount of damage in the fruit, and the output of the ramp generator is proportional to the size of the fruit (diameter), the resulting quotient will be in terms of percentage damage. That is to say, that the divider output is proportional to the total amount of damage contained in a very thin slice of the fruit divided by the length of the slice. In its broad concept, it is conceivable that as an alternative to utilizing a ramp function as the divisor, it may be necessary to use a parabolic function in order to compensate for the area instead of diameter.

A sample hold amplifier circuit 59 receives the output of the divider circuit 58, this output being of a wave form as indicated at 60. The purpose of the sample hold circuit is to hold the final size compensated output value of the divider, until the next fruit traverses the internal characteristic sensors 14, and thus provide a prolonged output signal as indicated at 61. This circuit embodies a basic amplifier component A15 which is controlled by an electronic switch S3 operatively connected to receive energizing voltage from the voltage terminal V1 of the timing circuit. The amplifier A15 is a unity gain amplifier with a resistor R41 in a feedback connection and a resistor R40 connected to the amplifier input. When the switch S3 is closed, a capacitor C21 will be charged to the amplifier output voltage. When the switch S3 is in opened position, the input signal is removed and the amplifier output remains at the voltage across the capacitor C21 which will be retained without significant decrease for several seconds. A capacitor C20 is utilized to reduce the amplifier gain, when the frequency is above 500 Hz.

A switched amplifier circuit 62 is provided for switching the output of the sample hold amplifier 59 so as to be turned on during its hold period, and off during the sample period as indicated by the output signal wave form 60 of the divider circuit 58. This circuit utilizes a basic amplifier component A16 which is controlled by an electronic switch S4 connected with the voltage terminal V2 of the timing circuit. When the switch S4 is closed, the amplifier functions as a unity gain amplifier. When the switch S4 is opened, feedback through a resistor R45 drops to zero and the amplifier output becomes zero. Thus, the output of this amplifier circuit occurs only during the hold period.

The output of the switched amplifier circuit 62 is fed as an input to a grade separator circuit 63, which basically comprises three voltage comparators, each of which has a variable threshold voltage. As will be seen, the switched fruit characteristic evaluation signal from the switched amplifier circuit 62 is fed through input resistors R46, R47, and R48, respectively, to basic amplifier components A17, A18, and A19 of the three voltage comparators. The threshold voltage for the respective comparators for the grades into which the fruit is to be separated, is determined and set by resistors R52, R53, and R54 and respectively fed to the amplifiers through resistors R49, R50, and R51. When the input is larger than the threshold voltage of one of the comparators, the connected diode D8, D9, or D10 will be reverse biased and its associated amplifier output will switch from 0 to +8 volts. This output voltage is fed to the other amplifiers through the respective diode-resistor combinations D5-R55, D6-R56, and D7-R57 to prevent more than one comparator output being supplied to the respective output terminals G-3, G-2, and G-1 at the same time.

With the circuit arrangement as just described, it will be observed that if the input is below the threshold voltage of amplifier A19, as set by resistor 54, then none of the amplifiers will be energized and all of the comparator outputs will be zero. If the input is above the threshold of amplifier A19 but below the threshold of amplifier A18, as set by resistor R53, then amplifier A19 will be energized and an output of 8 v. will appear at the G-1 terminal. If the input is above the threshold of amplifier A18 but below the threshold of amplifier A17, as set by resistor R52, then the amplifier A18 will be energized and an output of 8 v. will appear at the terminal G-2. This output voltage is also fed back to amplifier A19 so as to denergize it. A similar operation occurs when the input is above the threshold of amplifier A17, and the output voltage will appear at the G-3 terminal. The absence of an output voltage at any of the terminals G-1, G-2, or G-3 indicates that the fruit has a damage evaluation which is below that of fruit having the least damage as selected for grade G-1.

The internal quality computer and sorting or grading of the inspected fruits as heretofore described is controlled and coordinated by timing circuitry which will now be described, and which is connected to the output furnished by the photodiodes 40 and 41 (FIG. 7A). The timing sensor diodes are connected to the input of a preamplifier circuit 63 having a basic amplifier component A20 which is coupled with a voltage divider formed by resistors R57 and R58, this voltage divider being connected to provide normally a reverse bias on the photodiodes 40 and 41. The sensor signal is coupled to the amplifier component A20 by a capacitor 25 and a resistor R60. Resistors R59 and R61 form a feedback path that sets the amplifier gain to approximately 5, and the parallel connected capacitor 24 is utilized to reduce the gain to unity at high frequencies.

A timing offset adjust circuit 64 is provided for adjusting the voltage timing level. This circuit includes a basic amplifier component A21 which has its input connected with a DC voltage determined by a variable resistor R64 which may be mounted on a central control panel and varied to compensate for variations of skin thickness of the fruits being tested. The voltage determined by the resistor R64 is added to the timing signal received from the preamplifier circuit 63, through a resistor R63. As shown in the representative output curve 65, the skin compensation control is adjusted so that the points X—X on the wave form will be at zero volts. The integrator 56 will then be turned on after the fruit has started across the damage sensors and before it has finished. The output from the timing offset adjust circuit 64 is then fed through a voltage comparator circuit 66 which operates as a timing switch circuit. This circuit includes a basic amplifier component A22 connected to receive its input from a resistor R66, and the input current will function to establish a circuit through either the diode D3 or the diode D4 depending upon its polarity. The amplifier output will be −8 v. when the input is greater than zero, and +8 v. when the input is less than zero. Resistors R68 and R70 operate to clamp the output voltage to −8 v. when diode D4 is conducting, and resistors R67 and R69 operate to clamp the output to +8 v. when the diode D3 is conducting. Therefore, the voltage appearing at the terminal V1 will reflect the polarity changes of the output voltage.

The output from the voltage comparator circuit 66 as just described leads to a time delay circuit 67 which is utilized to invert and delay the output of the voltage comparator circuit so that the switch S3, which is connected to the terminal V1, for the sample hold circuit 59 can be switched to its on position slightly before the switch S1, which is connected to the terminal V2, of the integrator circuit 56 is actuated to an open condition. Resistors R71 and R72 of the time delay circuit are utilized to set the DC gain to 1, while the significant time required to charge a capacitor C27 provides the time delay between the input and the output of this circuit.

It is an important feature of the present invention that once the percentage damage is evaluated for a certain fruit, this information will be stored until that fruit during its transport by the conveyor C reaches a point at the sorting or grading station B where it is to be transferred or discharged into the proper group corresponding to its predetermined group evaluation. For such purpose, an electronic shift register circuit 67 (FIG. 6) is connected to each of the outputs G-1, G-2, and G-3 of the grade separator 63. The shift register is of conventional construction and has a memory cell for each fruit position between the inspection station A and the point where the fruit is to be transferred at the sorting station B. As each fruit moves through the inspection station, the information in each shift register is shifted from one memory cell to the next, thus keeping step with the fruit movement. The shifting operations are accomplished in each shift register by switching means which are synchronized with the passage or conveyance of the fruit through the inspection station and may comprise a voltage signal obtained for example from the terminal V1 of the timing circuit or other synchronized pulse generating means 68, as exemplified by such known devices or mechanisms as an optical shaft decoder, a micro-switch mechanically actuated by a rotating shaft, switch pulsing means magnetically actuated in response to shaft rotation, or other suitable means. When the fruit reaches the proper separation point, the shift register functions to energize its associated solenoid 25 to actuate the mechanism for tilting the fruit conveyor platform 17 to discharge the fruit thereon into the appropriate receiver for that particular group as previously explained. The undamaged fruit which is not discharged at the G-1, G-2, or G-3 stations will be carried by the conveyor and discharged at the G-0 station, this being the undamaged and most acceptable of the inspected fruit.

Values of the components as used in the circuitry of the herein disclosed invention are listed as follows:

AMPLIFIERS

| | Burr-Brown | |
|---|---|---|
| A1, A2 | 1557/15 | |
| A3, A4 | 3007/15 | |
| A5, A6 | 4007/40 | |
| A7, A8 | 3007/15C | |
| A9 | 3006/15C | |
| A10 | 3009/15C | |
| A11, A12 | 3007/15C | |
| A13–A16 | 3006/15C | |
| A17, A18, A19 | 3009/15C | |
| A20 | 3007/15C | |
| A21 | 3009/15C | |
| A22, A23 | 3007/15C | |
| Switches | | |
| S1–S4 | Burr-Brown 9580/15 | |
| DIVIDER | | |
| DV1 | Burr-Brown 4098/25 | |
| RESISTORS | ohms | |
| R1, R2 | 2.43K | |
| R3, R4 | 24.3K | |
| R5, R6 | 15K | |
| R7, R8 | 13.7K | |
| R9, R10 | 6.81K | |
| R11, R12 | 10K | (Potentiometer) |
| R13, R14 | 20K | (Potentiometer |
| R15, R16 | 4.53K | |
| R17, R18 | 20.5K | |
| R19, R20 | 1.5K | |
| R21, R22 | 10K | |
| R23 | 10K | (Potentiometer) |
| R24–R28 | 10K | |
| R29 | 10K | (Potentiometer) |
| R30 | 10K | |
| R31 | 10K | (Potentiometer) |
| R32 | 4.99K | |
| R33 | 1M | |
| R34 | 10K | |
| R35 | 1.5K | |
| R36 | 30.9K | |
| R37 | 100K | |
| R38–R48 | 10K | |
| R49–R51 | 15K | |
| R52–R54 | 10K | (Potentiometer) |
| R55, R56 | 4.99K | |
| R57, R58 | 1M | |
| R59 | 20.5K | |
| R60 | 1M | |
| R61 | 100K | |
| R62 | 33.2K | |
| R63 | 51.1K | |
| R64 | 10K | (Potentiometer) |
| R65 | 150K | |
| R66 | 100K | |
| R67, R68 | 10K | |
| R69, R70 | 4.99K | |
| R71, R72 | 100K | |
| CAPACITORS | | |
| C1, C2 | 0.01 mf | |
| C3, C4 | 0.133 mf | |
| C5, C6 | 0.033 mf | |
| C7–C12 | 0.22 mf | |
| C13–C15 | 0.01 mf | |
| C16 | 330 pf | |
| C17 | 0.05 mf | |
| C18 | 0.10 mf | |
| C19 | 330 pf | |
| C20 | 1000 pf | |
| C21 | 0.10 mf | |
| C22, C23 | 1000 pf | |
| C24 | 0.0033 mf | |
| C25 | 1.0 mf | |
| C26 | 1000 pf | |
| C27 | 0.033 mf | |
| DIODES | | |
| D1–D7 | IN4154 | |
| D8–D10 | IN3155 | |
| PHOTODIODES | | |
| 40, 41 | Electro-Nuclear Labs LB 0515 | |
| CRYSTAL ASSEMBLY | | |
| 35 | Sodium-Iodide Harshaw 6S4 | |
| PHOTOMULTIPLIER TUBE | | |
| 32 | RCA 6199 | |

From the foregoing description and drawings, it will be clearly evident that the delineated objects and features of the invention will be accomplished.

Various modifications may suggest themselves to those skilled in the art without departing from the spirit of the herein disclosed invention and, hence, it is not wished to be restricted to the specific form shown or uses mentioned, except to the extent indicated in the appended claims.

We claim:

1. The method of automatically selecting and separating internally damaged citrus fruit from undamaged fruit, which comprises the steps of:
   a. simultaneously scanning meat portions on opposite sides of each fruit core with X-rays;
   b. sensing variations in X-ray transparencies of the scanned portions;
   c. integrating the sensed variations to evaluate said damage and nondamage; and
   d. classifying the fruits in accordance with such evaluations.

2. The method according to claim 1 including the further steps of compensating the integrated sensed variations for fruit size to obtain damage evaluations in terms of percentage.

3. Apparatus for grading objects according to changes in a common internal characteristic thereof, comprising:
   a. an inspection station;
   b. a sorting station including a plurality of sorting positions corresponding to various possible classification grades of the objects according to said internal characteristics thereof;
   c. conveyor means for continuously moving said objects in sequence through said inspection station to said sorting station;
   d. X-ray means at said inspection station for successively evaluating changes in said internal characteristic of each object and determining its grade classification; and
   e. means at each sorting position energizable for removing from said conveyor each object with a determined grade classification corresponding to that of the sorting position.

4. Apparatus for automatically selecting between a plurality of generally spherical objects based on the X-ray transparency characteristics thereof, which comprises:
   a. a source of X-rays;
   b. means for translating successive changes in transparency between different parts on opposite sides of the center of each object subjected to said X-rays into an integrated electrical signal; and
   c. means for selecting between the objects on the basis of this electrical signal.

5. Apparatus according to claim 4, wherein the objects comprise core containing fruits initially oriented to align their cores, and said fruits are successively moved along a path through the X-rays, and the transparency translating means includes means for integrating the changes along said path for the different parts on the opposite sides of the fruit core axis; and including means for limiting the integrated changes substantially to parts in the meat portion of the fruit between the denser skin portions at the leading and trailing ends of the fruit.

6. Apparatus according to claim 5, wherein the limiting means comprises a switching circuit for activating and deactivating said integrating means, and including timing sensor means in said path, said sensor means being responsive to the interception of X-rays by the skin portions at the leading and trailing ends of the fruit.

7. Apparatus according to claim 6, wherein the timing sensor means includes two photodiodes spaced apart in the direction of said path a distance substantially corresponding to the skin thickness at the leading and trailing ends of the fruit.

8. Apparatus according to claim 4, wherein said objects comprise citrus fruits oriented with their core axes substantially correspondingly positioned, and said fruits are successively moved along a path through the X-rays, and the transparency translating means comprises fruit damage sensor means for sensing X-rays in said different parts along said path on opposite sides of the fruit core axis.

9. Apparatus according to claim 8, wherein the damage sensor means comprises a pair of damage sensor units operatively positioned to straddle the core of each fruit as it is moved along said path, each of said sensor units including a photomultiplier tube having a photosensitive surface; and means secured adjacent said photosensitive surface capable of variably scintillating in response to the changes in said X-ray transparency of the different parts.

10. Apparatus for automatically inspecting and sorting citrus fruits into different grades according to the extent of their internal nondamage and damage, comprising;
   a. a source of X-rays;
   b. conveyor means for successively moving citrus fruit in a path passing through said X-rays;
   c. sensing means for translating successive changes for each fruit of its X-ray transparency along said path into electric signals;
   d. electronic computer means for converting said electric signals for each fruit into an electric output characteristic of its internal damage in relation to one of said grades;
   e. fruit discharge positions traversed by said conveyor corresponding to the respective grades of said fruit; and
   f. control means synchronized with the movements of said fruits for selectively discharging each fruit from said conveyor when it reaches its grade discharge position.

11. Apparatus according to claim 10, wherein said synchronized control means includes memory means for storing said electrical output characteristic for each fruit until it reaches its corresponding grade discharge position.

12. Apparatus for grading objects according to a common internal characteristic thereof, comprising:
   a. an inspection station;
   b. a sorting station including a plurality of sorting positions corresponding to various possible classifications of the objects according to said internal characteristics thereof;
   c. conveyor means for continuously moving said objects in sequence through said inspection station to said sorting station;
   d. X-ray means at said inspection station for successively evaluating said internal characteristic of each object and determining its classification, including two spaced apart sensors for simultaneously evaluating adjacent paths through said object; and
   e. means at each sorting position energizable for removing from said conveyor each object with a determined classification corresponding to that of the sorting position.

13. Apparatus for automatically inspecting and sorting citrus fruits into different grades according to the extent of their internal nondamage and damage, comprising:
   a. a source of X-rays;
   b. conveyor means for successively moving citrus fruit in a path passing through said X-rays;
   c. sensing means for translating each fruit X-ray transparency into electric signals, comprising a pair of damage sensor units spaced to traverse scanning paths on opposite sides of the core of a preoriented fruit, each of said units including a photomultiplier tube operatively associated with means capable of scintillating in response to variations in the X-ray transparency along the path scanned by said unit and providing output electric signals in accordance with said variations;
   d. electronic computer means for converting said electric signals for each fruit into an electric output characteristic of its internal damage in relation to one of said grades;
   e. fruit discharge positions traversed by said conveyor corresponding to the respective grades of said fruit; and
   f. control means synchronized with the movements of said fruits for selectively discharging each fruit from said conveyor when it reaches its grade discharge position.

14. Apparatus according to claim 13, wherein the electronic computer means includes a pair of damage evaluating circuits having inputs respectively connected to receive the output electric signals of said photomultiplier tubes, and outputs connected into a difference amplifier circuit wherein the evaluation signals for one of said scanning paths are subtracted from the evaluation signals for the other of said scanning paths.

15. Apparatus according to claim 14, wherein each of said damage evaluating circuits contains logarithmic amplifier circuit means having components operable to compensate for the logarithmic absorption characteristic of the fruit in such a manner that a change due to damage will cause the same output for a small fruit as for a large fruit, and its output voltage increases upwardly towards a predetermined positive voltage potential.

16. Apparatus according to claim 15, wherein the input to each logarithmic amplifier is connected with a noise filter circuit having components for eliminating high frequency noise signals that do not relate to fruit damage, and the output of the logarithmic amplifier is connected to pass through a high pass filter circuit having components for eliminating low frequency signals caused by drift errors, fruit length irregularities and differences in thickness from one side of the fruit to the other.

17. Apparatus according to claim 14, wherein the output of the difference amplifier circuit is coupled with a gain adjusting circuit means having components variable to set the gain at the most desirable values for the particular type of internal damage that is being evaluated.

18. Apparatus according to claim 17, which includes an absolute value amplifier circuit having an input connected with the output of the gain adjusting circuit and components operative to provide at its output an absolute value of its received input.

19. Apparatus according to claim 18, which includes an integrator circuit having components operative to integrate the output of the absolute value amplifier circuit for the period during which the fruit is moved over the damage sensor units and timed switching means for controlling said components so that the integrated output will be for the time that the damage sensor units are scanning the meat portion of the fruit.

20. Apparatus according to claim 19, including a ramp generator circuit having components operable to provide an output ramp wave form variable for fruit size compensation, timed switching means for controlling the operation of the ramp generator during a period concurrent with that of said integrator circuit, and divider circuit means coupled with the outputs of said ramp generator circuit and the integrator circuit and having components operative to divide the output of the integrator circuit by the output of the ramp generator circuit to obtain a percentage evaluation of the fruit damage.

21. Apparatus according to claim 20, including a sample hold amplifier circuit connected to receive the output signal of said divider, and including components operative to prolong said output signal for each fruit at its output value until the next fruit traverses the sensor units.

22. Apparatus according to claim 21, including a switched amplifier circuit connected to receive the output of the sample hold circuit, and having switching components for applying the hold portion of said received output to a grade separator circuit.

23. Apparatus according to claim 22, wherein said grade separator circuit comprises a plurality of voltage comparator circuits having threshold activating voltages for selectively providing group determinative outputs for the grade separator circuit depending upon the input value of the switched fruit characteristic damage evaluation signal.

24. The method of inspecting core type fruits to determine as between internally damaged and nondamaged fruits, which comprises the steps of:
 a. successively moving core oriented fruits through an X-ray scanning path; and
 b. simultaneously sensing variations in X-ray transparency of meat containing portions lying on opposite sides of each fruit core.

* * * * *